United States Patent
Schaeuble

(10) Patent No.: US 9,452,738 B2
(45) Date of Patent: Sep. 27, 2016

(54) WIPER BLADE FOR CLEANING VEHICLE WINDOWS

(71) Applicant: Valeo Systémes d'Essuyage, Le Mesnil Saint Denis (FR)

(72) Inventor: Michael Schaeuble, Vaihingen/Enz (DE)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 275 days.

(21) Appl. No.: 13/954,153

(22) Filed: Jul. 30, 2013

(65) Prior Publication Data

US 2014/0026349 A1    Jan. 30, 2014

(30) Foreign Application Priority Data

Jul. 30, 2012 (DE) .................. 10 2012 106 944

(51) Int. Cl.
*B60S 1/40*    (2006.01)
*B60S 1/48*    (2006.01)
*B60S 1/38*    (2006.01)
*B60S 1/52*    (2006.01)

(52) U.S. Cl.
CPC .............. *B60S 1/40* (2013.01); *B60S 1/3805* (2013.01); *B60S 1/3862* (2013.01); *B60S 1/3867* (2013.01); *B60S 1/524* (2013.01); *B60S 1/4045* (2013.01); *B60S 2001/4054* (2013.01)

(58) Field of Classification Search
CPC ...... B60S 1/40; B60S 1/3805; B60S 1/3862; B60S 1/4045; B60S 1/4041; B60S 1/3849; B60S 1/524; B60S 1/3867; B60S 1/4038; B60S 1/4048
USPC .............. 15/250.32, 250.04, 250.05–250.09
See application file for complete search history.

(56) References Cited

U.S. PATENT DOCUMENTS

2006/0064838 A1*  3/2006 Poton ......................... 15/250.32

FOREIGN PATENT DOCUMENTS

DE   10 2010 025 687 A1    1/2012
FR        2885105         * 11/2006

* cited by examiner

*Primary Examiner* — Gary Graham
(74) *Attorney, Agent, or Firm* — Osha Liang LLP

(57) ABSTRACT

The invention relates to a wiper blade (10) for cleaning vehicle windows, with a wiper-blade body (20) connected to a wiper-blade adapter (11), wherein the wiper-blade adapter (11) consists of a wiper-arm-side adapter element (12) and a wiper-blade-side adapter element (13) which are connected to one another and arranged pivotably relative to one another in an axis (14), and with a supply element (32) arranged pivotably in the axis (14) for the hydraulic and/or electrical supply of the wiper blade (10), wherein the supply element (32) is accommodated between two side walls (41, 42) of the wiper-blade-side adapter element (13).

18 Claims, 2 Drawing Sheets

Figure 2:
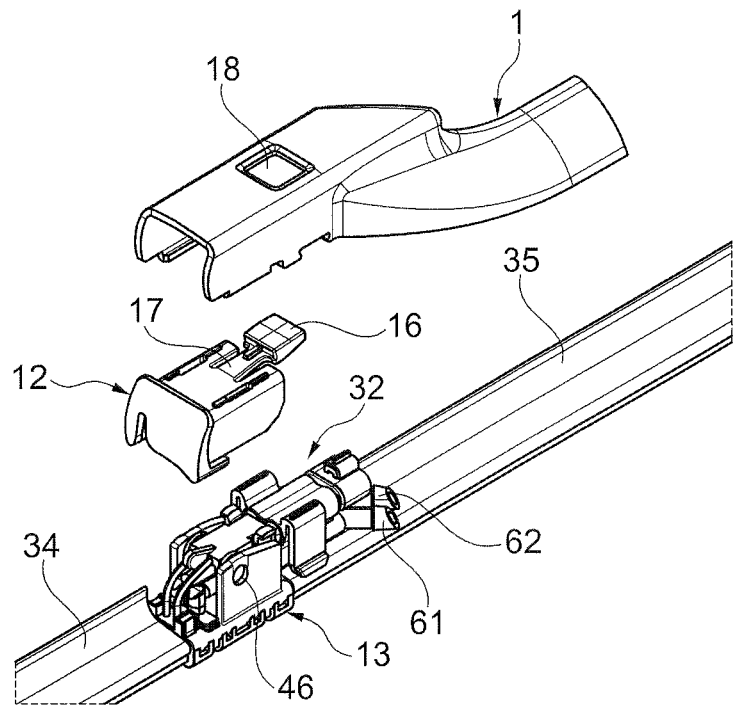

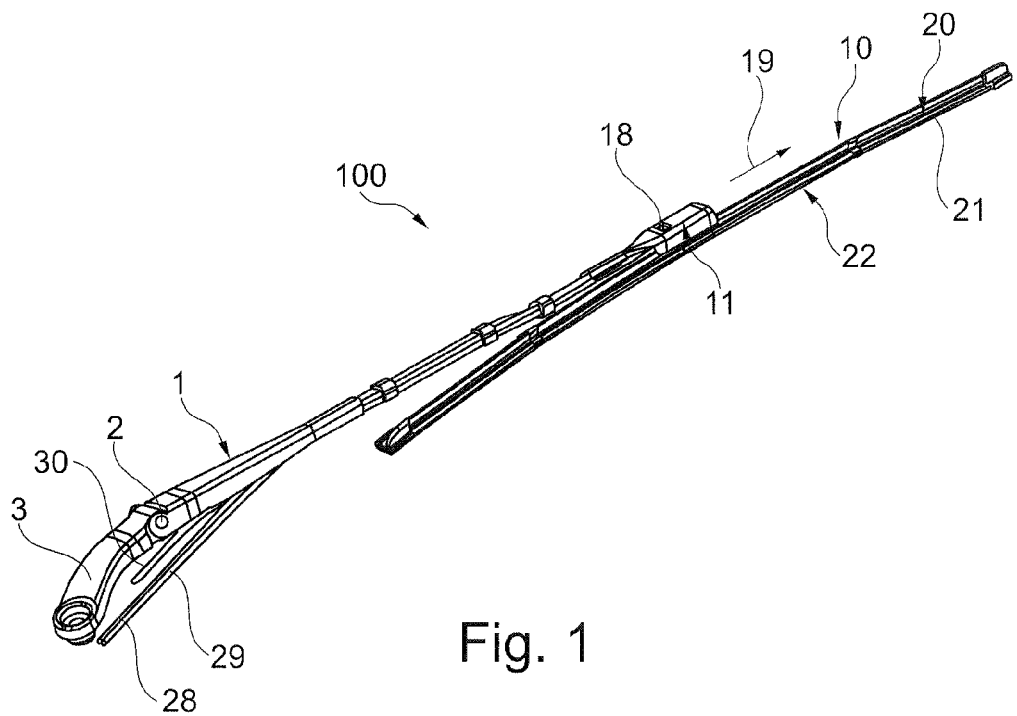
Fig. 1
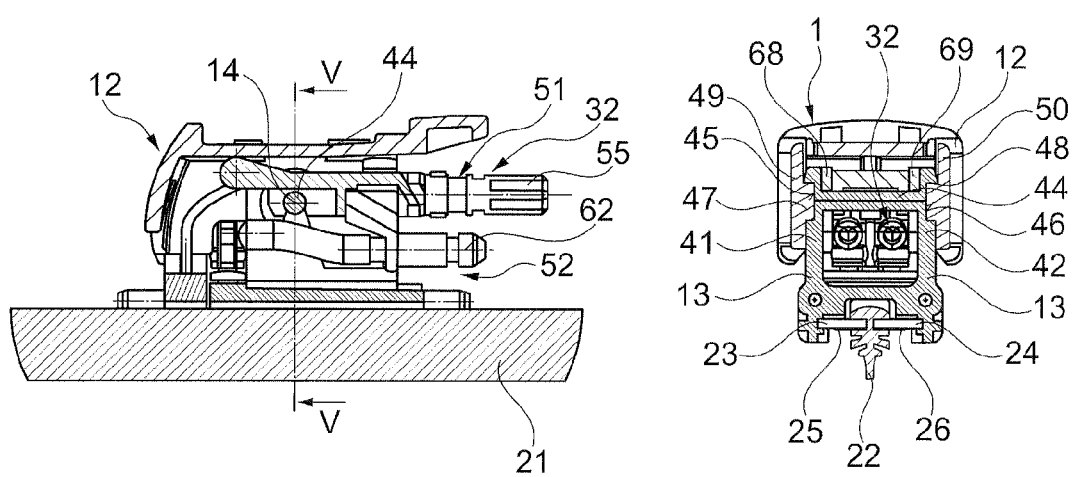
Fig. 4
Fig. 5

WIPER BLADE FOR CLEANING VEHICLE WINDOWS

PRIOR ART

The invention relates to a wiper blade for cleaning vehicle windows in accordance with the precharacterizing clause of Claim 1.

A wiper blade of this type is known from DE 10 2010 025 687 A1 by the applicant. The known wiper blade has a wiper-blade adapter, by way of which the wiper blade can be fastened exchangeably to a wiper arm. The wiper-blade adapter consists of a wiper-arm-side adapter element and a wiper-blade-side adapter element which are arranged pivotably relative to one another in an axis, in order that the wiper blade can be adapted in an optimum manner to the contour of the vehicle window during the wiping operation. Furthermore, the known wiper blade has a supply element which serves to supply the wiper blade with washing fluid and to supply electricity to a heating device of the wiper blade. To this end, the wiper blade comprises washing-fluid channels which run in the longitudinal direction of the wiper blade and heating foils which are connected, for example, to the spring bars which serve to reinforce the wiper blade, as a constituent part of the heating device. In the known wiper blade, the supply element is arranged between the wiper-blade-side adapter element and the wiper-arm-side adapter element and can likewise be pivoted about the abovementioned axis. In order to make the pivotability of the wiper-blade-side adapter element with respect to the supply element possible, the wiper-blade-side adapter element has a substantially U-shaped cross section with two side walls, apertures which at the same time form the pivot axis being situated in the side walls. A clearance is formed between the two side walls at the level of and below the axis in the longitudinal direction, in order to make the introduction or insertion of the supply element possible. Whereas the supply element is arranged in the intermediate space between the two side walls of the wiper-blade-side adapter element, the wiper-arm-side adapter element engages around the side walls of the wiper-blade-side adapter element from the outside. For reasons of the minimization of the installation space, the wiper-blade adapter is to have as small a width as possible. Since, moreover, the supply element requires a defined amount of installation space in its width, it is required in order to minimize the installation space to form the side walls of the wiper-blade-side adapter element to be relatively thin. As a result, the side walls have a relatively low flexural stiffness, which is not desired both during the assembly of the individual components and during the operation per se.

DISCLOSURE OF THE INVENTION

Proceeding from the prior art which is shown, the invention is based on the object of developing a wiper blade for cleaning vehicle windows in accordance with the precharacterizing clause of Claim 1 in such a way that increased mechanical stability or rigidity of the side walls of the wiper-blade-side adapter element is achieved, in particular in the region of the axis, without increasing the width of the installation space of the wiper-blade adapter as a result. According to the invention, this object is achieved in a wiper blade for cleaning vehicle windows having the features of Claim 1 by virtue of the fact that the two side walls are connected to one another by way of a transverse strut which is arranged in the axis, that the transverse strut has a circular cross section at least in regions, and that the carrier element has holding sections which enclose the transverse strut in a positively locking manner at least in regions. According to the invention, the advantage is achieved as a result that the two side walls are connected (integrally) to one another by the transverse strut, with the result that increased rigidity of the side walls in a plane perpendicularly with respect to the longitudinal direction of the wiper blade is achieved by way of the component assembly which is formed as a result. Moreover, the transverse strut has an additional function, by the transverse strut at the same time serving to mount holding sections of the supply element which enclose the transverse strut in a positively locking manner at least in regions. No additional installation space is therefore required in the region of the wiper-blade adapter for mounting the supply element. A circular cross section of the transverse strut in regions is understood to mean that the transverse strut has to be configured in the relevant region, in which the supply element is connected to the transverse strut, such that the supply element can be pivoted on the transverse strut. It is therefore sufficient that the transverse strut has a cross section which is circular at least in regions, for example, over a part region of its length.

Advantageous developments of the wiper blade according to the invention for cleaning vehicle windows are described in the subclaims. All combinations of at least two of the features disclosed in the claims, the description and/or the figures fall within the scope of the invention.

In order to make assembly which is as simple as possible of the supply element on the transverse strut of the wiper-blade-side adapter element possible, it is provided that the holding sections have insertion regions which open into receptacles, and that the holding sections can be pushed onto the transverse strut by means of the insertion regions, the holding sections forming a latched connection with the transverse strut in the assembled state of the supply element.

The supply element preferably serves for the simultaneous supply of the wiper blade with washing fluid and with electrical current for the heating device. As a result, it is necessary that the supply element has corresponding connection possibilities both on the vehicle-side side, that is to say on the side of the wiper arm, and in the direction towards the wiper blade or towards the wiper-blade body. A supply element of this type is therefore relatively difficult to produce, in particular if it is to be of compact configuration, on account of its many functional elements, and/or has a relatively complex shape. In order to simplify the production of a supply element of this type, it can therefore be provided that the supply element comprises a first part element for electrical supply and a second part element for hydraulic supply, and that both part elements in each case have holding sections with openings which enclose the transverse strut. As a result, it is also conceivable, inter alia, to provide merely one of the two-part elements without any other structural modifications if the wiper blade is equipped either only with washing-fluid channels or only with a heating device.

In one structurally preferred refinement, if two, separate part elements are used to form the supply element, it is provided that one of the two part elements has side walls, between which the other part element is received in the region of the transverse strut. As a result, the available installation space between the side walls of the wiper-blade-side adapter element is utilized in an optimum manner, and the arrangement of the part elements which has the side walls is effected in such a way that its side walls are at a relatively great spacing from one another, with the result that mechanically particularly advantageous receiving of the part element is made possible.

In order, moreover, to simplify the assembly process if two separate part elements are used for the supply element, it is provided that the two part elements are connected to one another by way of an additional latched connection. It is possible as a result to connect the two part elements to one another, for example, in a pre-assembly step, and to mount them subsequently as one unit on the wiper-blade-side adapter element.

Moreover, it is very particularly preferred, if two part elements are used, if the two part elements have a (positively locking) geometry which interacts with one another and orients the openings on the carrier arms of the part elements so as to be flush with one another. As a result, the assembly process of the two part elements on the transverse strut is simplified and damage to the part elements is prevented.

In one alternative refinement, however, it can also be provided that the supply element is configured as a single-piece component which has both the washing-fluid connection and the electrical connection. In this case, the assembly, in particular, is simplified in so far as merely one single element has to be connected to the transverse strut, with the result that, for example, only two holding sections also have to be provided on the (single) carrier element.

In order to make the pivotable arrangement of the wiper-arm-side adapter element with respect to the wiper-arm-side adapter element possible, it is provided in one preferred structural refinement that the side walls of the wiper-blade-side adapter element have depressions on the outer faces which face away from the transverse strut for pivotably receiving bearing projections of the wiper-arm-side adapter element.

Figure 3:
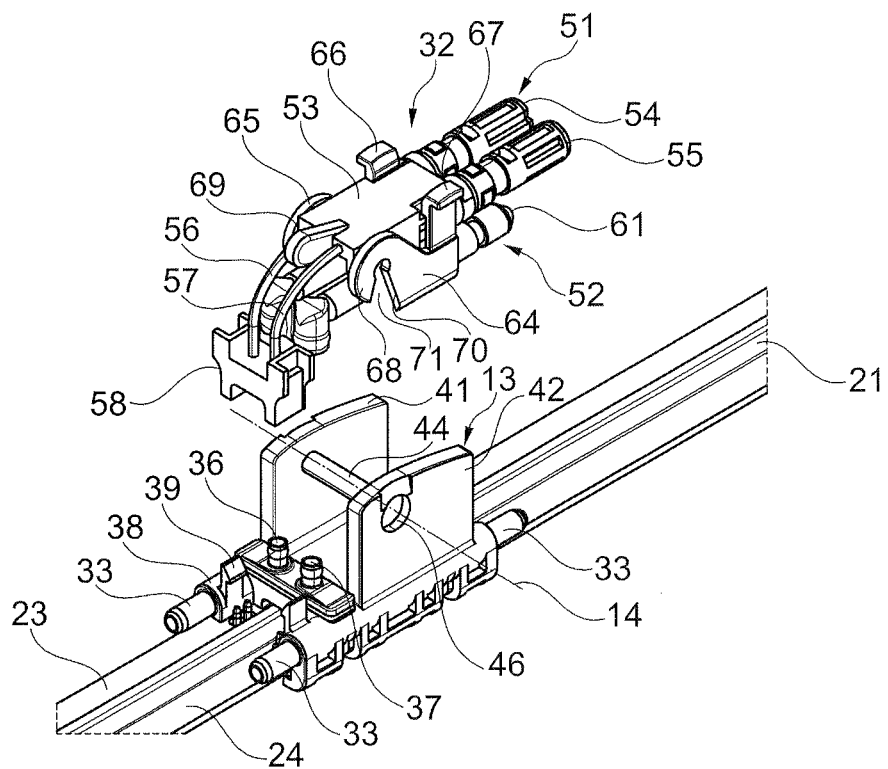

Further advantages, features and details of the invention result from the following description of preferred exemplary embodiments and using the drawing, in which:

FIG. 1 shows a perspective view of a wiper apparatus, comprising a wiper arm and a wiper blade according to the invention for cleaning vehicle windows, FIG. 2 shows the region of the wiper-blade fastening to the wiper arm with the use of a wiper-blade adapter in an exploded illustration, FIG. 3 shows the wiper-blade-side adapter element and a supply element in an exploded illustration, FIG. 4 shows a longitudinal section through a wiper blade according to the invention in the region of the wiper-blade fastening, and FIG. 5 shows a section in the plane V-V of FIG. 4.

Identical elements or elements with an identical function are provided with the same reference numerals in the figures.

FIG. 1 shows a wiper apparatus 100 for cleaning a vehicle window (not shown). The wiper apparatus 100 has a wiper arm 1 which is fastened pivotably to a bearing element 3 via a wiper-arm hinge 2. The bearing element 3 is for its part connected to a shaft of a wiper drive (not shown).

A wiper blade 10 according to the invention is fastened exchangeably to the wiper arm 1. A wiper-blade adapter 11 serves for this purpose which is arranged on the wiper blade 10 and comprises a wiper-arm-side adapter element 12 and a wiper-blade-side adapter element 13 which are arranged pivotably relative to one another in an axis 14. As can be seen, in particular, using FIG. 2, the wiper-arm-side adapter element 12 has a latching knob 16 which is formed integrally on the wiper-arm-side adapter element 12 via a spring tongue 17. In the mounted state of the wiper blade 10 on the wiper arm 1, the latching knob 16 engages into a latching opening 18 which is formed on the upper side of the wiper arm 1, in such a way that the latching knob 16 is arranged in a positively locking manner in the latching opening 18 and forms a latched connection. The release of the wiper blade 10 from the wiper arm 1 takes place in a known way by pressing the latching knob 16 into the latching opening 18 with subsequent longitudinal displacement of the wiper blade 10 on the wiper arm 1 in the dismantling direction which is indicated by the arrow 19 in FIG. 1.

The wiper blade 10 has a wiper-blade body 20 which has a strip-shaped wiper rubber 21 with a wiper lip 22 which is connected to the wiper rubber 21 via a tilting web. Spring bars 23, 24 which serve for reinforcement and are usually pre-bent are arranged in the receptacles of U-shaped cross section of the wiper rubber 21 on the two longitudinal sides of the wiper rubber 21 (FIG. 3). The spring bars 23, 24 are in turn enclosed in a straddled manner by the wiper-blade-side adapter element 13 and are fixed on the latter.

In the exemplary embodiment, the wiper blade 10 is configured as an electrically heatable wiper blade 10. To this end for example, in each case one heating-foil element 25, 26 is arranged on the underside, facing the wiper lip 22, of the two spring bars 23, 24 (FIG. 5). Furthermore, the wiper blade 10 is configured as what is known as an "aquablade wiper 10", that is to say washing-fluid channels (not shown in the figures) are formed on both sides in the longitudinal direction of the wiper-blade body 20, which washing-fluid channels serve to supply spray nozzles (likewise not shown) with washing fluid. The supply of the wiper blade 10 with electricity for the heating device or washing fluid takes place by way of example via two washing-fluid hoses 28, 29 which are arranged in a protected manner in the wiper arm 1 and via an electrical connection line 30. Here, one washing-fluid hose 28 is assigned to one longitudinal side of the wiper-blade body 20, whereas the other washing-fluid hose 29 is assigned to the other longitudinal side of the wiper-blade body 20. As a result, it is made possible, depending on the movement direction of the wiper blade 10, to supply washing fluid to that side of the wiper blade 10 which leads in each case in the movement direction of the wiper blade 10. The washing-fluid hoses 28, 29 and the electrical connection line 30 are connected to a supply element 32 which is in two parts in the exemplary embodiment and is arranged in the wiper-blade adapter 11.

As can be seen, in particular, using FIGS. 2 and 3, the wiper-blade-side adapter element 13 has supply stubs 33 for the washing fluid, which supply stubs 33 are arranged in the longitudinal direction of the wiper blade 10 and engage into longitudinal holes (not shown) of covering elements 34, 35 which are arranged on both sides of the wiper-blade adapter 11, and in which the abovementioned washing-fluid channels are formed. The upper sides of the covering elements 34, 35 can be of spoiler-like configuration, as can be seen, in particular, in FIG. 2, in order to increase the contact pressure of the wiper blade 10 on the vehicle window at relatively high speeds. The supply stubs 33 are connected hydraulically to inflow stubs 36, 37 on the wiper-blade-side adapter element 13. Furthermore, two electrical connection pins 38, 39 can be seen in FIG. 3, via which electrical contact is made with the heating-foil elements 25, 26.

The wiper-blade-side adapter element 13 has two side walls 41, 42 which are arranged parallel to one another and are of plate-like configuration. The axis 14, about which both the wiper-arm-side adapter element 12 and the supply element 32 are mounted pivotably, is formed according to the invention by a transverse strut 44 which connects the two side walls 41, 42 of the wiper-blade-side adapter element 13 to one another. A cylindrical depression 45, 46 is formed on the outer side of each side wall 41, 42 so as to be flush with the transverse strut 44. The two depressions 45, 46 serve to receive cylindrical bearing projections 47, 48 which are formed integrally on two opposite side walls 49, 50 of the one wiper-arm-side adapter element 12 which has a substantially U-shaped cross section (FIG. 5).

The transverse strut 44 serves to mount and fasten the supply element 32. The supply element 32 comprises a first part element 51 and a second part element 52 which serve for the hydraulic and electrical supply of the wiper blade 10 with washing fluid and electricity. The first part element 51 which serves for the electrical power supply of the heating device has a block-shaped centre region 53 with two connection plugs 54, 55 which make contact with the electrical connection line 30. The first part element 51 can be connected electrically to the connection pins 38, 39 via lines 56, 57 and a latching plug 58.

Hydraulic connection stubs 61, 62 of the second part element 52 are arranged in a plane below the first part element 51, which hydraulic connection stubs 61, 62 can be connected to the supply stubs 33 via a connection plug 63.

The second part element 52 has side walls 64, 65 which are arranged parallel to one another and between which the centre region 53 of the first part element 51 is received. Furthermore, latching hooks 66, 67 are arranged on the two side walls 64, 65, which latching hooks 66, 67 form a latched connection with corresponding recesses of the centre region 53 of the first part element 51. In addition, the two part elements 51, 52 have a positively locking geometry which orients the two part elements 51, 52 with respect to one another.

The two side walls 64, 65 of the second part element 52 form holding sections 68, 69 for the transverse strut 34. To this end, the holding sections 68, 69 in each case have a V-shaped insertion region 70 which opens into a receptacle 71. The receptacle 71 which is configured as an aperture has a circular cross section, the diameter of the receptacle 71 being adapted to the diameter of the transverse strut 44 which likewise has a circular cross section.

In an aligned manner with respect to the insertion regions 70 and receptacles 71 of the second part element 52, the first part element 51 also has corresponding receptacles and insertion regions which cannot be seen in the figures, however.

The assembly of the supply element 32 on the wiper-blade-side adapter element 13 takes place by moving the supply element 32 and the wiper-blade-side adapter element 13 with respect to one another in the region of the insertion regions 70 and the transverse strut 44 in such a way that the receptacles 71 form a latched connection with the transverse strut 44, in which latched connection the receptacles 71 enclose the transverse strut 44 in a positively locking manner at least in regions. The wiper-arm-side adapter element 12 is subsequently connected to the wiper-blade-side adapter element 13, by the projections 47, 48 latching into the depressions 45, 46 of the side walls 41, 42 of the wiper-blade-side adapter element 13.

The above-described wiper blade 10 can be changed or modified in a wide variety of ways, without deviating from the concept of the invention. In particular, instead of a two-piece supply element 32, it is conceivable to use a single-piece supply element 32, in which the two part elements 51, 52 are configured as one single-piece component. Furthermore, it is conceivable that merely one of the part elements 51, 52 is used if the wiper blade 10 is to have merely a washing function or a heating function.

LIST OF REFERENCE NUMERALS

1 Wiper arm
2 Wiper-arm hinge
3 Bearing element
10 Wiper blade
11 Wiper-blade adapter
12 Wiper-arm-side adapter element
13 Wiper-blade-side adapter element
14 Axis
16 Latching knob
17 Spring tongue
18 Latching opening
19 Arrow
20 Wiper-blade body
21 Wiper rubber
22 Wiper lip
23 Spring bar
24 Spring bar
25 Heating-foil element
26 Heating-foil element
28 Washing-fluid hose
29 Washing-fluid hose
30 Connection line
32 Supply element
33 Supply stub
34 Covering element
35 Covering element
36 Inflow stub
37 Inflow stub
38 Connection pin
39 Connection pin
41 Side wall
42 Side wall
44 Transverse strut
45 Depression
46 Depression
47 Bearing projection
48 Bearing projection
49 Side wall
50 Side wall
51 First part element
52 Second part element
53 Centre region
54 Connection plug
55 Connection plug
56 Line
57 Line
58 Latching plug
61 Connection stub
62 Connection stub
63 Connection plug
64 Side wall
65 Side wall
66 Latching hook
67 Latching hook
68 Holding arm
69 Holding arm
70 Insertion region
71 Receptacle
100 Wiper apparatus

The invention claimed is:
1. A wiper blade for cleaning vehicle windows, comprising:
a wiper-blade body connected to a wiper-blade adapter, wherein the wiper-blade adapter includes a wiper-arm-side adapter element and a wiper-blade-side adapter element which are connected to one another and arranged pivotably relative to one another about an axis, and wherein the wiper-arm-side adapter element is structurally separate from a wiper arm; and a hydraulic and/or electrical supply of the wiper blade;

a supply element arranged pivotably about the axis for the hydraulic and/or electrical supply of the wiper blade, wherein the supply element is accommodated between two side walls of the wiper-blade-side adapter element, wherein the side walls are connected to one another with a transverse strut arranged about the axis, wherein the transverse strut has a circular cross section at least in certain regions, and wherein the supply element has holding sections which encompass the transverse strut in a positive-fitting manner at least in certain regions.

2. The wiper blade according to claim 1, wherein the holding sections have insertion regions which open into receptacles, and wherein the holding sections can be pushed onto the transverse strut by means of the insertion regions, wherein the holding sections form a snap connection with the transverse strut in the mounted state of the supply element.

3. The wiper blade according to claim 1, wherein the supply element consists of a first part element for electrical supply and a second part element for hydraulic supply, and both part elements in each case have holding sections with openings which encompass the transverse strut.

4. The wiper blade according to claim 3, wherein one part element has side walls, between which the other part element is accommodated.

5. The wiper blade according to claim 3, wherein the two part elements are connected to one another by an additional snap connection.

6. The wiper blade according to claim 3, wherein the two part elements have mutually interacting geometries which align receptacles flush with one another.

7. The wiper blade according to claim 3, wherein the first part element has a block-shaped center region with at least one connection plug and comprises means to supply electricity to the wiper blade.

8. The wiper blade according to claim 7, wherein the block-shaped center region of the first part element is received by parallel side walls of the second part element.

9. The wiper blade according to claim 8, wherein latching hooks on the parallel side walls of the second part element latches onto corresponding recesses on the block-shaped center region of the first part element.

10. The wiper blade according to claim 3, wherein the second part element has at least one hydraulic connection stub and comprises means to hydraulically connect at least one washing-fluid channel of the wiper blade.

11. The wiper blade according to claim 1, further comprising a single, integrally-constructed supply element used both for hydraulic and electrical supply.

12. The wiper blade according to claim 1, wherein the side walls of the wiper-blade-side adapter element have depressions for the pivotable mounting of the wiper-arm-side adapter element on the external side facing away from the transverse strut.

13. The wiper blade according to claim 1, wherein the wiper-arm-side adapter element is detachably connected from the wiper arm.

14. The wiper blade according to claim 13, wherein the wiper-arm-side adapter element has a latching knob adapted to engage into a latching opening formed on the wiper arm.

15. The wiper blade according to claim 1, wherein two spring bars are arranged in receptacles of the wiper-blade body, and the two spring bars are enclosed in a straddled manner by the wiper-blade-side adapter element.

16. The wiper blade according to claim 15, wherein at least one heating-foil element is arranged on at least one of the two spring bars and is electrically connected with the supply element.

17. The wiper blade according to claim 1, wherein the wiper blade has at least one washing-fluid channel hydraulically connected with the supply element.

18. The wiper blade according to claim 17, wherein the wiper-blade-side adapter element has at least one supply stub and at least one inflow stub hydraulically connected with the at least one supply stub, and the at least one supply stub is adapted to hydraulically connect the at least one washing-fluid channel of the wiper blade.

* * * * *